(12) United States Patent  
Rollyson et al.

(10) Patent No.: US 8,136,727 B2  
(45) Date of Patent: Mar. 20, 2012

(54) PRODUCE WEIGHING SCALE WITH A CAMERA AND METHODS OF OPERATING A PRODUCE WEIGHING SCALE HAVING A CAMERA

(75) Inventors: Stephen Rollyson, Lawrenceville, GA (US); Dale Ehrhardt, Canton, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/829,030

(22) Filed: Jul. 1, 2010

(65) Prior Publication Data

US 2012/0000976 A1    Jan. 5, 2012

(51) Int. Cl.  
*G06K 15/00* (2006.01)

(52) U.S. Cl. .............................. 235/383; 235/375; 705/28

(58) Field of Classification Search .................. 235/375, 235/383, 385; 705/28  
See application file for complete search history.

(56) References Cited

U.S. PATENT DOCUMENTS

| 7,913,909 B2* | 3/2011 | Iizaka et al. .................. 235/454 |
| 2003/0121974 A1* | 7/2003 | Blanford et al. ............... 235/383 |
| 2004/0199427 A1* | 10/2004 | van der Loo .................... 705/16 |
| 2005/0145693 A1* | 7/2005 | Baitz et al. ..................... 235/383 |
| 2006/0208893 A1* | 9/2006 | Anson et al. ................ 340/572.1 |
| 2009/0132492 A1* | 5/2009 | Satoh et al. ......................... 707/3 |

* cited by examiner

*Primary Examiner* — Daniel Hess  
*Assistant Examiner* — Matthew Mikels  
(74) *Attorney, Agent, or Firm* — Michael Chan

(57) ABSTRACT

A produce weighing scale is provided for a retail grocery store. The produce weighing scale comprises a base, a weighing platform disposed on the base, and a touchscreen arranged to enable a retail customer to enter produce data associated with a produce item and to view display screens which contains instructions to operate the produce weighing scale. An actuatable camera is positioned over the weighing platform and is provided for, when actuated, capturing at least a partial image of a produce item which has been placed on the weighing platform. Electronic control circuitry is arranged to (i) provide an actuation signal to actuate the camera in response to a retail customer placing a produce item on the weighing platform, and (ii) display a barcode chit on the touchscreen to allow a retail customer to self-scan the displayed barcode chit without having to print the barcode chit.

20 Claims, 8 Drawing Sheets

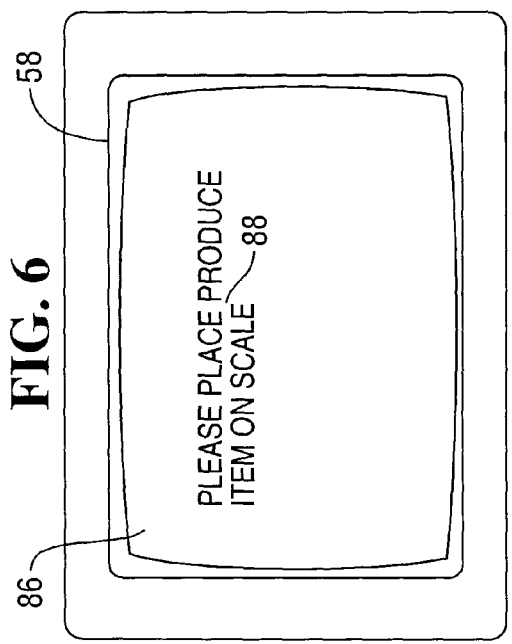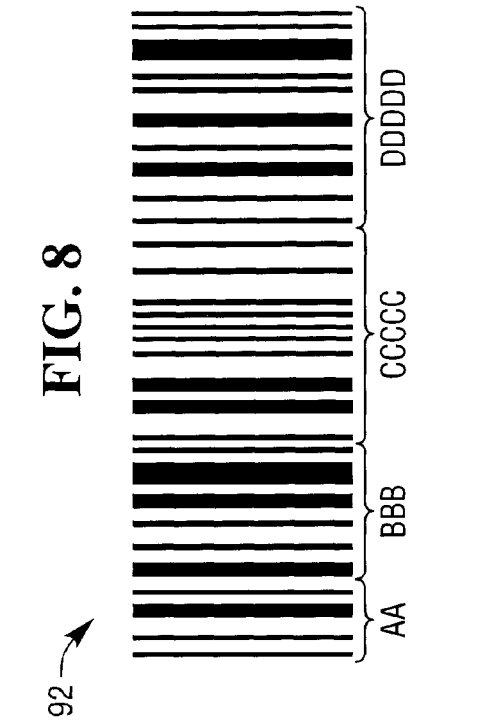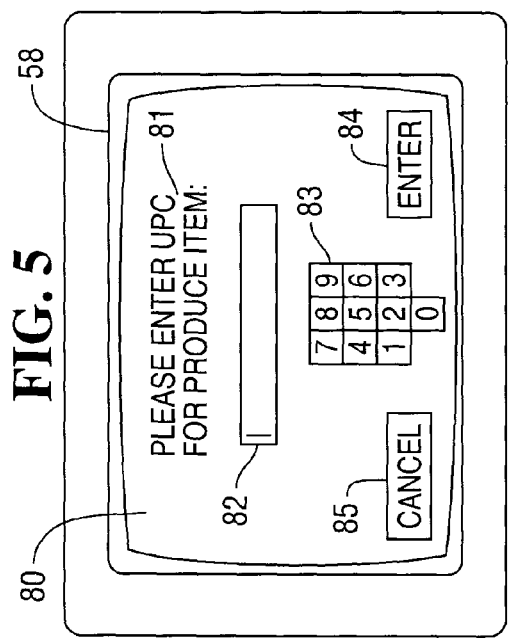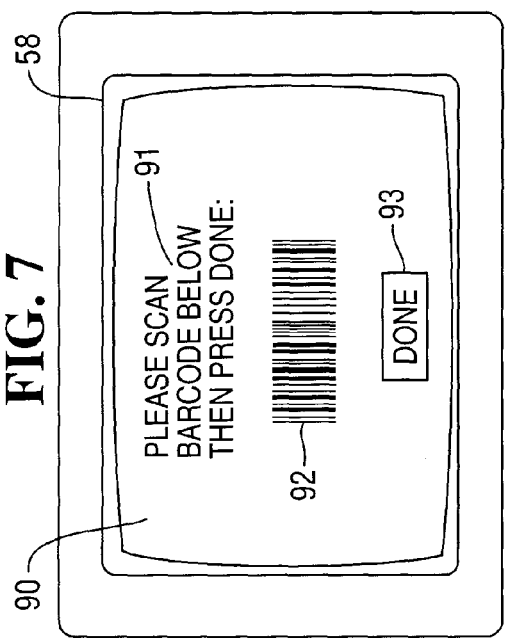

PRODUCE WEIGHING SCALE WITH A CAMERA AND METHODS OF OPERATING A PRODUCE WEIGHING SCALE HAVING A CAMERA

BACKGROUND

The present invention relates to produce weighing scales, and is particularly directed to a produce weighing scale having a camera and methods of operating a produce weighing scale having a camera.

A typical produce weighing scale is located in the produce section of a retail grocery store, and is intended for use by retail store clerks. A retail store clerk weighs a produce item which is desired to be purchased by a retail customer, waits for a barcode chit to print, and then adhesively attaches the printed barcode chit to a bag or wrap which contains the produce item. When the customer is ready to checkout, the customer takes the bag or wrap to a self-service checkout pay station and scans the printed barcode chit. A drawback in this case is that a retail store clerk is needed to weigh the produce item. Another drawback is that a barcode chit needs to be printed and then adhesively attached to the bag or wrap which contains the produce item.

In some retail grocery stores, a produce weighing scale is located at the self-service checkout pay station. In this case, the customer weighs the produce item to be purchased when the customer checks out at the self-service checkout pay station. A drawback in this case is that the customer needs to handle produce items in a way which is different from the way in which non-produce items are handled. Another drawback is that the customer does not know the price of the produce item until the customer checks out at the self-service checkout pay station.

In some other retail stores, a customer may use a portable barcode gun to self scan items including produce items to be purchased. The customer can self scan items either before the customer arrives at the self-service checkout pay station or at the time when the customer arrives at the self-service checkout pay station. In the former case, a retail store clerk weighs the produce item on a produce weighing scale located in the produce section of the retail grocery store. In the latter case, the customer weighs the produce item on a produce weighing scale located at the self-service checkout pay station. In either of these two cases, the same drawbacks just described hereinabove are present. It would be desirable to provide an improved produce weighing scale and methods of operating such a produce weighing scale so that the customer need not have to handle produce items in a different way from non-produce items and so that barcode chits need not have to be printed for produce items.

SUMMARY

In accordance with one embodiment of the present invention, a produce weighing scale is provided for a retail grocery store. The produce weighing scale comprises a base, a weighing platform disposed on the base, a touchscreen arranged to enable a retail customer to enter produce data associated with a produce item and to view display screens which contains instructions to operate the produce weighing scale, an actuatable camera positioned over the weighing platform and for, when actuated, capturing at least a partial image of a produce item which has been placed on the weighing platform, and electronic control circuitry arranged to (i) provide an actuation signal to actuate the camera in response to a retail customer placing a produce item on the weighing platform, and (ii) display a barcode chit on the touchscreen to allow a retail customer to self-scan the displayed barcode chit without having to print the barcode chit.

BRIEF DESCRIPTION OF THE DRAWINGS

In the accompanying drawings:

FIG. 5 is a view of a first customer instruction screen displayed on a touchscreen of the produce weighing scale of FIG. 2;

FIG. 6 is a view similar to FIG. 5, and showing a second customer instruction screen displayed on the touchscreen;

FIG. 7 is a view similar to FIG. 5, and showing a third customer instruction screen including a barcode chit which is displayed on the touchscreen;

FIG. 8 is an enlarged view of the barcode chit which appears in the third customer instruction screen of FIG. 7;

DETAILED DESCRIPTION

The present invention relates to produce weighing scales, and is particularly directed to a produce weighing scale having a camera and methods of operating a produce weighing scale having a camera.

Figure 1:
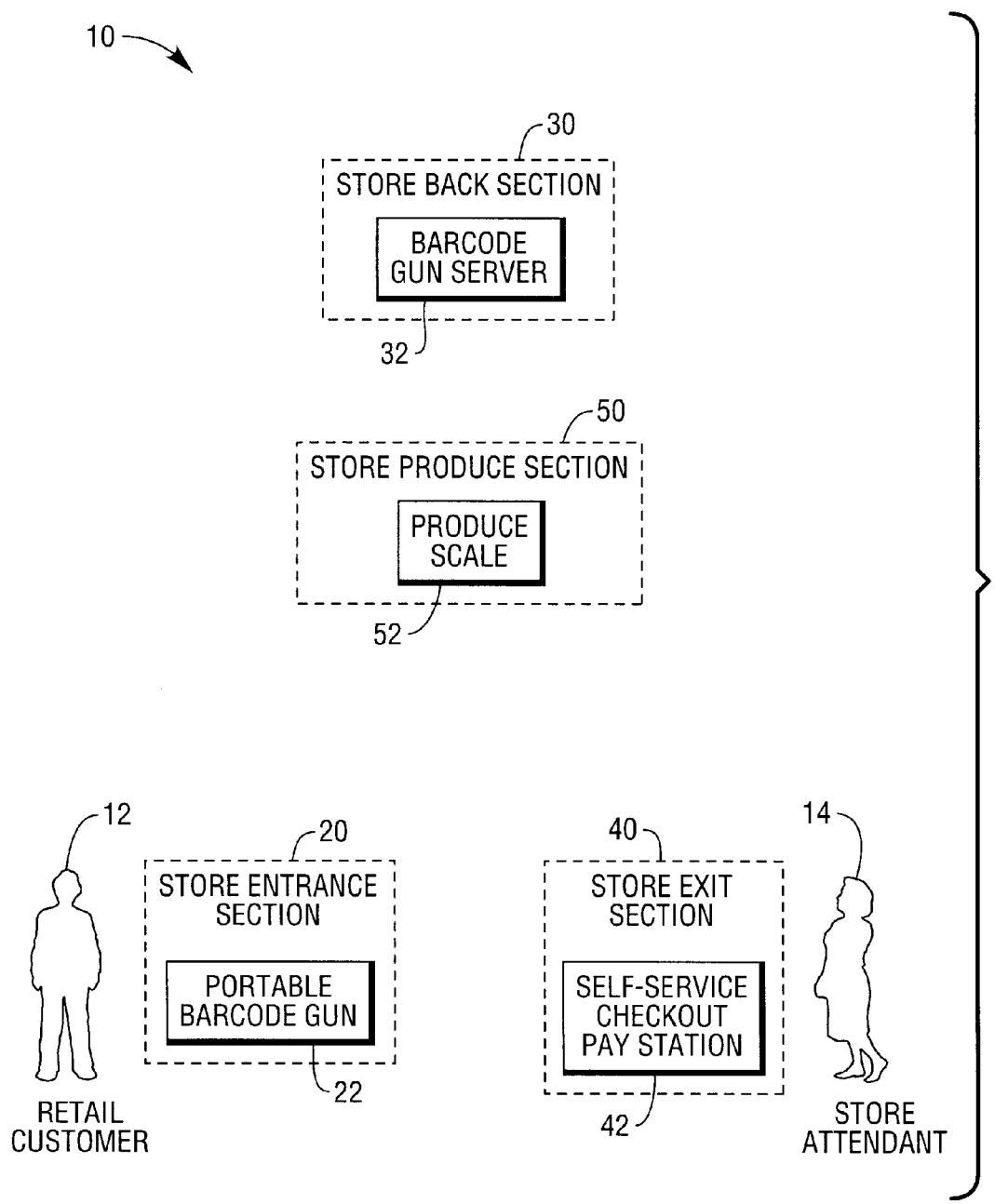
FIG. 1 is a system diagram illustrating various store components located in different sections of a retail grocery store.

Referring to FIG. 1, a system diagram illustrates various store components located in different sections of a retail grocery store 10. The retail grocery store 10 includes a store entrance section 20 in which a number of portable barcode guns are located. For simplicity, only one portable barcode gun is shown in FIG. 1, and is designated with reference numeral "22". When a retail customer 12 enters the store entrance section 20 of the retail grocery store 10, the retail customer obtains the portable barcode gun 22 and uses the portable barcode gun to self scan barcoded items as is known.

The retail grocery store 10 further includes a store back section 30 in which a barcode gun server 32 is located. The portable barcode gun 22 and the barcode gun server 32 comprise a portable barcode gun system in which barcodes scanned by the portable barcode gun 22 are wirelessly transmitted to the barcode gun server 32. Structure and operation of such portable barcode gun systems are well known and, therefore, will not be described. The retail grocery store 10 also includes a store exit section 40 in which a self-service checkout pay station 42 is located. The self-service checkout pay station 42 may comprise any type of self-service terminal at which the customer 12 can checkout and pay for grocery items. A store attendant 14 is usually in the vicinity of the self-service checkout pay station 42 to assist customers as needed.

Figure 2:
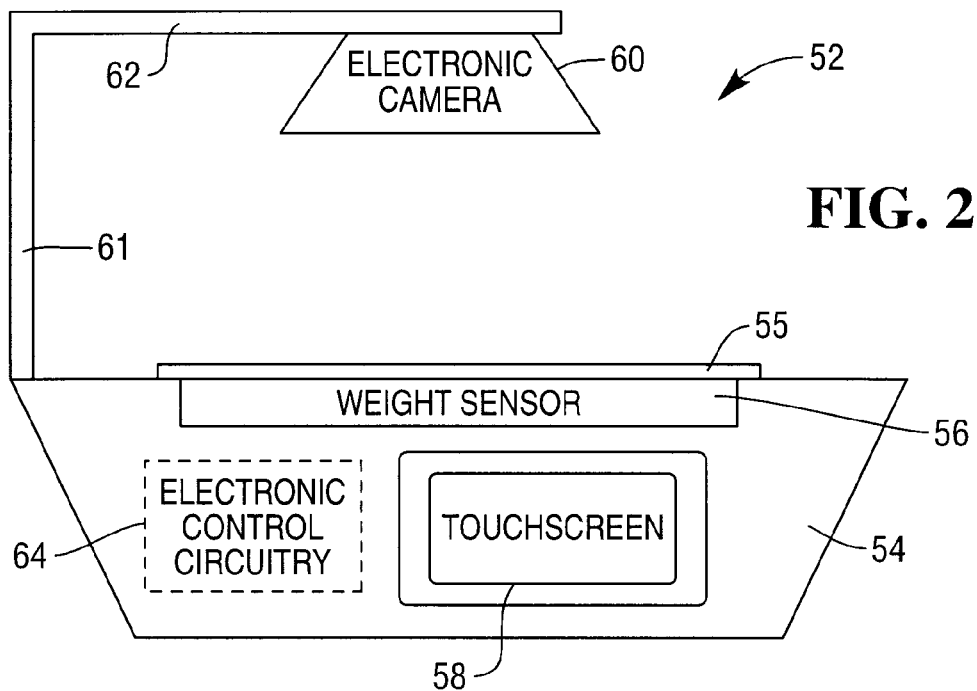
FIG. 2 is a somewhat schematic block diagram of a produce weighing scale which is used in the retail grocery store of FIG. 1.

The retail grocery store 10 further includes a store produce section 50 in which a produce weighing scale 52 is located. As shown in FIG. 2, the produce weighing scale 52 includes a base 54 over which a substantially planar-shaped weighing platform 55 is disposed. A weight sensor 56 is located beneath the weighing platform 55. The weight sensor 56 provides an electrical output signal indicative of weight of a produce which has been placed onto the weighing platform 55, as is known. A touchscreen 58 acts as a user interface and enables the retail customer 12 to interact with the produce weighing scale 52 in a manner to be described later.

A first support arm 61 extends substantially vertically from the base 54, and a second support arm 62 extends substantially transverse to the first support arm 61. Accordingly, the second support arm 62 extends substantially horizontally relative to the weighing platform 55. As shown in FIG. 2, an actuatable electronic camera 60 is disposed at a distal end of the second support arm 62. The length of the first support arm 61 and the length of the second support arm 62 are selected such that the camera 60 is positioned over the weighing platform 55 to capture at least a partial image of a produce item which has been placed on the weighing platform 55. The camera 60 may be positioned over the weighing platform 55 such that a full image of a produce item is captured when the produce item is placed on the weighing platform 55. The camera 60 may be a digital color camera or a digital black and white camera. The camera 60 may be a webcam type of camera which is turned on all of the time, but which captures a still-image of a produce item whenever a trigger signal is provided to actuate the camera.

Figure 3:
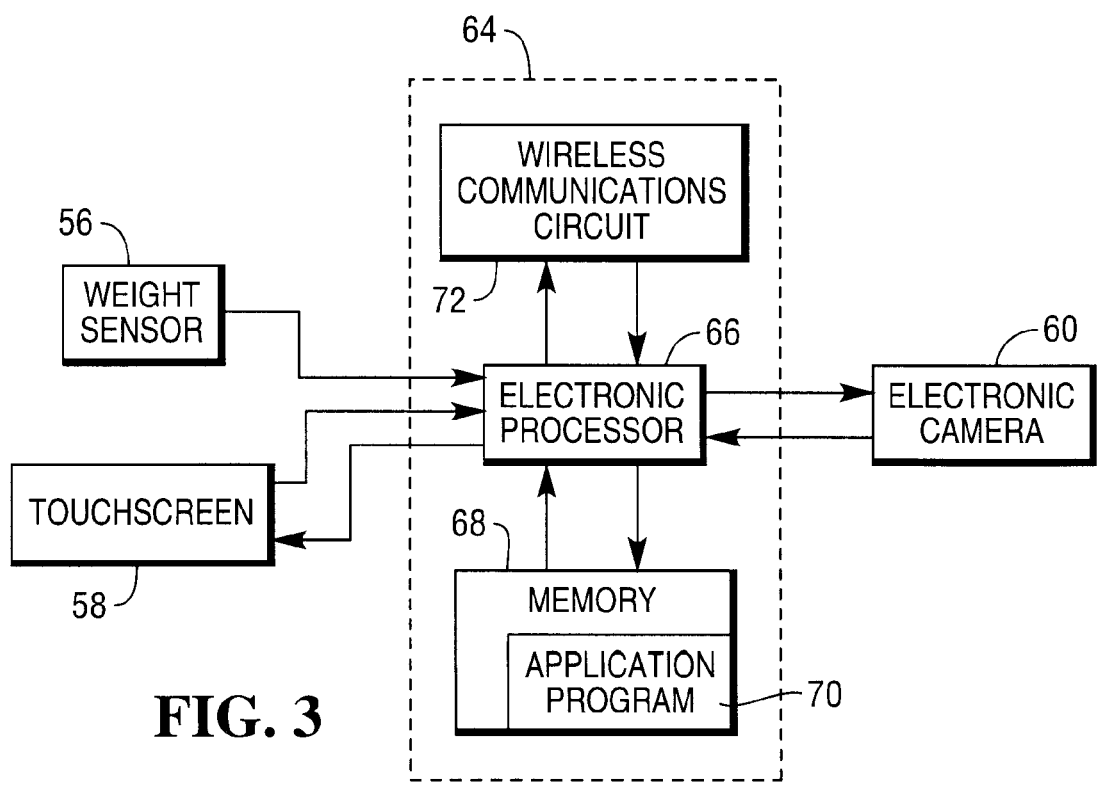
FIG. 3 is a schematic block diagram of electronic control circuitry which is used in the produce weighing scale of FIG. 2.

Referring to FIGS. 2 and 3, electronic control circuitry 64 is provided for controlling operation of the produce weighing scale 52. Electronic control circuitry 64 may be disposed in an interior chamber of the base 54 as shown in FIG. 2. As shown in FIG. 3, electronic control circuitry 64 includes an electronic processor 66, a memory 68 which stores instructions of an application program 70, and a wireless communications circuit 72. The electronic processor 66 executes instructions of the application program 70 to process a number of electrical input signals received from the weight sensor 56, the touchscreen 58, the camera 60, and the wireless communications circuit 72. The electronic processor 66 then provides a number of electrical output signals to provide output display screens on the touchscreen 58, to control operation of the wireless communications circuit 72, and to control operation of the camera 60 in a manner to be described later. Structure an operation of electronic processors, memories, weight sensors, touchscreens, cameras, and wireless communications circuits are known and, therefore, will not be described.

The camera 60 and the processor 66 may be hardwired to communicate with each other. In this case, the hardwire connections may be contained in a number of wiring harnesses which pass through interior chambers of the first and second support arms 61, 62. Alternatively, the camera 60 and the processor 66 may wirelessly communicate with each other. In this case, suitable electronics are provided to support wireless communications between the camera 60 and the processor 66.

Figure 4:
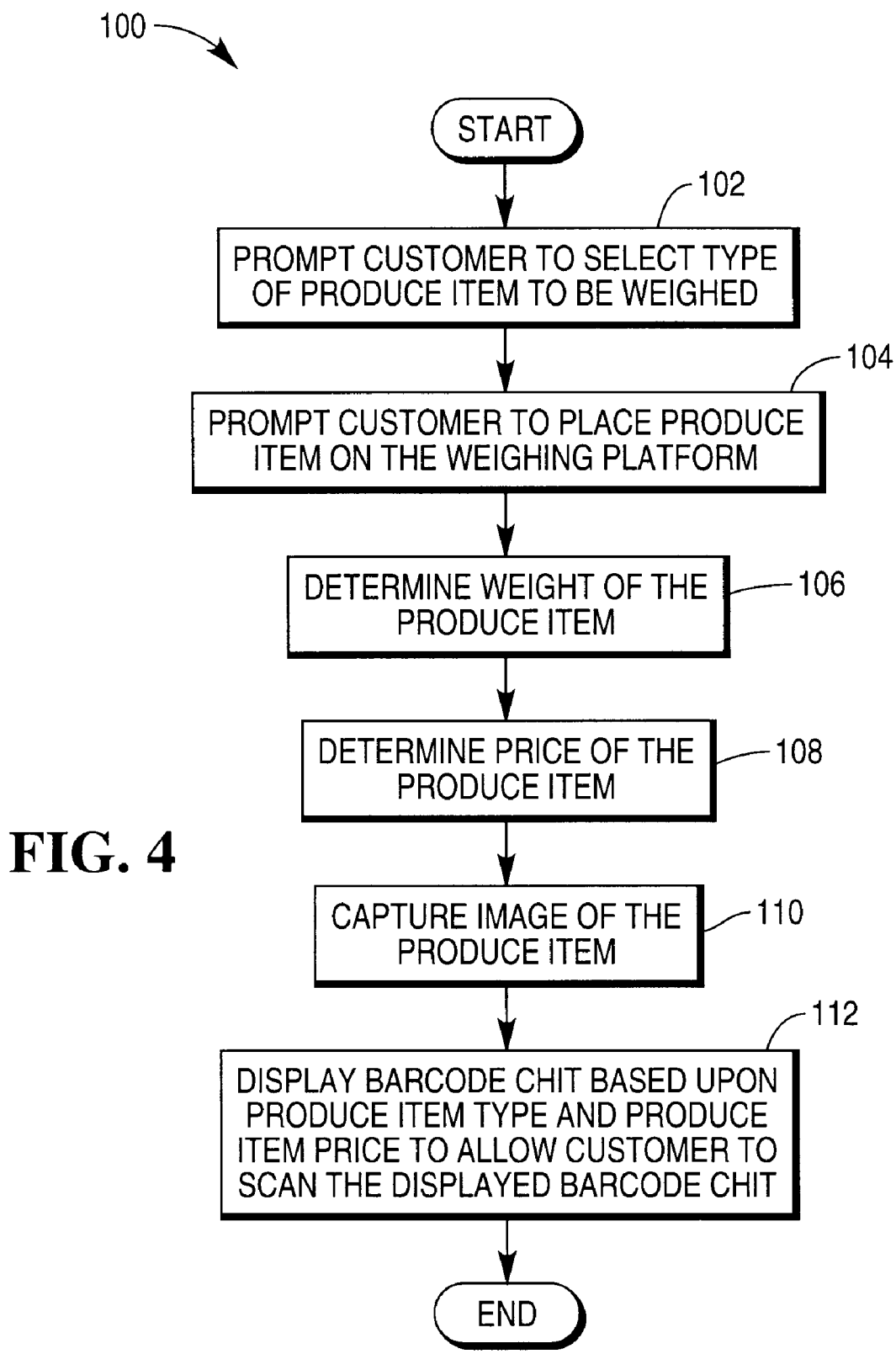
FIG. 4 is a flowchart depicting operation of the produce weighing scale of FIG. 2.

Referring to FIG. 4, a flowchart 100 depicts operation of the produce weighing scale 52 in accordance with instructions of the application program 70 stored in the memory 68. A prompt on touchscreen 58 initially prompts the customer 12 to select the type of the produce item to be weighed (step 102). This prompt may be in the form of a first display screen 80, such as shown in FIG. 5, which requests the customer 12 to enter the Universal Product Code (UPC) associated with the particular produce item desired to be weighed. As shown in FIG. 5, the first display screen 80 comprises text 81 which requests the customer 12 to enter the UPC on line 82 by pressing numbers on digit pad 83 and then pressing "Enter" key 84. A "Cancel" key 85 is provided in case the customer 12 presses an incorrect number on line 82 before pressing the "Enter" key 84.

After the customer 12 has selected the type of the produce item to be weighed, a second display screen 86, such as shown in FIG. 6, prompts the customer 12 to place the produce item on the weighing platform 55 of the produce weighing scale 52 (step 104). As shown in FIG. 6, the second display screen 86 comprises text 88 which requests the customer 12 to place the produce item to be weighed on the weighing platform 55 of the produce weighing scale 52.

After the customer 12 has placed the produce item on the weighing platform 55 of the produce weighing scale 52, the weight of the produce item is determined (step 106) and the price of the produce item is determined (step 108). The price may be determined by multiplying the weight of the produce item (as indicated by the electrical output signal from the weight sensor 56) with a price/unit-of-weight value which is associated with the particular produce item. The price/unit-of-weight value may be stored in the memory 68. Then, the camera 60 is actuated to capture an image (i.e., an electronic picture) of the produce item (step 110). The image of the produce item should be captured immediately after the price of the produce item is determined, which is essentially immediately after the produce item has been placed on the weighing platform 55 since it takes the electronic processor 66 only a relatively short amount of time (typically only a fraction of seconds) to determine both the weight of the produce item and the price of the produce item.

After the price of the produce item is determined and the picture of the produce item is captured, a third display screen 90 comprising a barcode chit 92, such as shown in FIG. 7, is displayed on the touchscreen 58 (step 112). The third display screen 90 also prompts the customer 12 to scan the displayed barcode chit 92 which appears in the third display screen. As shown in FIG. 7, the third display screen 90 comprises text 91 which requests the customer 12 to scan the displayed barcode chit 92 and then to press "Done" key 93 after the barcode chit has been scanned. More specifically, the customer 12 uses the portable barcode gun 22 (FIG. 1) to scan the displayed barcode chit 92 directly from the third display screen 90. Accordingly, no printout of the barcode chit 92 is needed for scanning of the barcode chit to occur.

The barcode chit 92 appearing in the third display screen 90 on the touchscreen 58 may comprise a number of different identifier parts. As shown in the enlarged view of FIG. 8, the barcode chit 92 comprises four identifier parts. A first part "AA" identifies the item as a produce item, a second part "BBB" identifies the type of the produce item, a third part "CCCCC" identifies the price of the produce item, and a fourth part "DDDDD" identifies the particular produce weighing scale 52 at which the produce item is being weighed. The fourth identifier part "DDDDD" is referred to herein as "the referral ID", and use of this referral ID will be described later.

Figure 9:
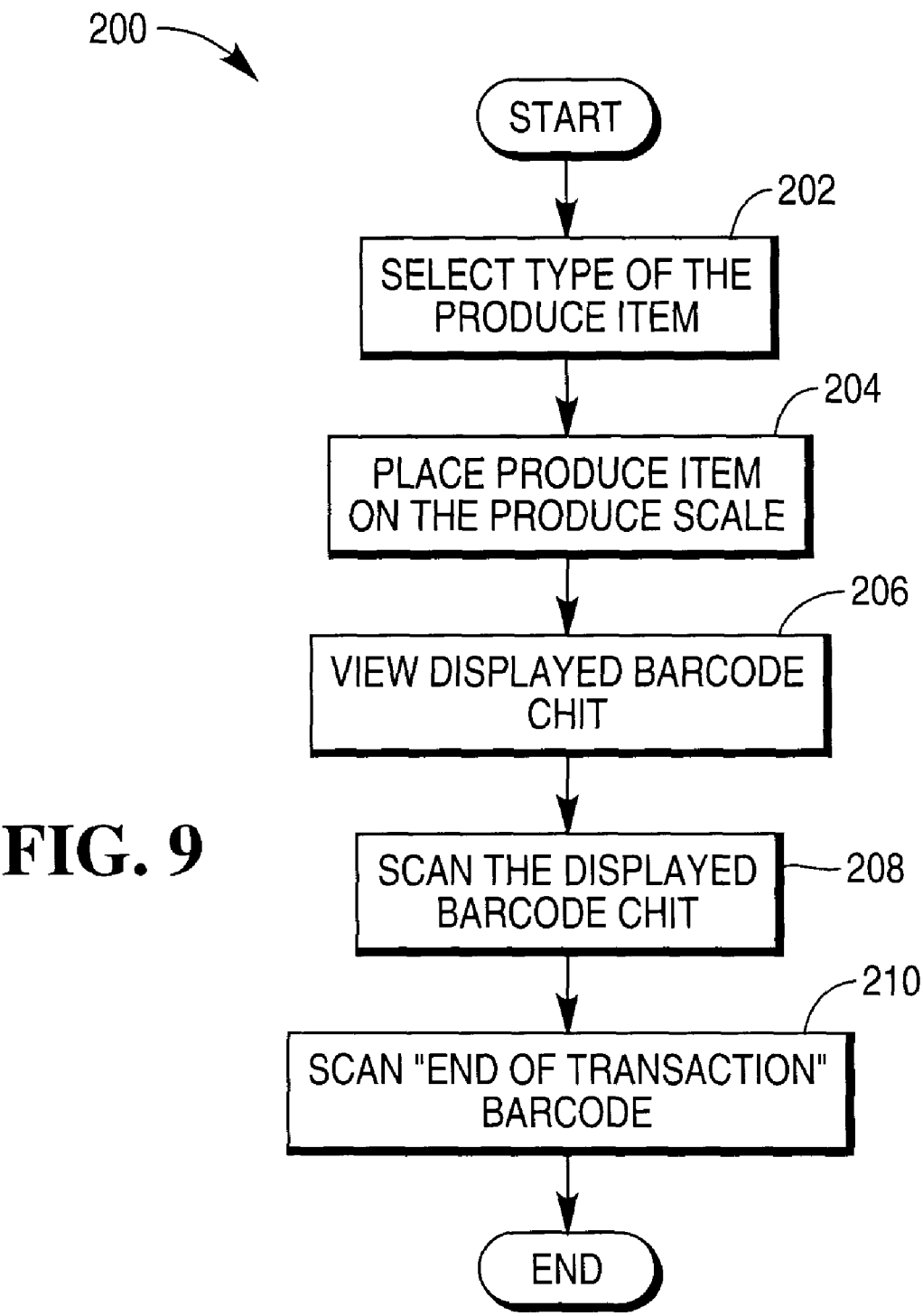
FIG. 9 is a flowchart depicting steps undertaken by a retail customer using the produce weighing scale of FIG. 2.

Referring to FIG. 9, a flowchart 200 depicts steps undertaken by the customer 12 in using the produce weighing scale 52. After the customer 12 selects the type of the produce item to be weighed (step 202) and places the produce item on the weighing platform 55 of the produce weighing scale 52 (step 204), the customer sees the displayed barcode chit 92 (step 206) which appears in the third display screen 90 on the touchscreen 58 as just described hereinabove. After the customer 12 scans the displayed barcode chit 92 (step 208), the customer 12 proceeds to a self-service checkout pay station to make payment for purchase of the produce item.

When the customer 12 arrives at a self-service checkout pay station, the customer scans an "end of transaction" barcode using the portable barcode gun 22 (step 210). There are a number of ways that this "end of transaction" code can be provided. As an example, the "end of transaction" barcode may be adhesively attached to the particular self-service checkout pay station at which the customer has arrived at. As another example, the "end of transaction" barcode may be supplied by the store attendant 14 (FIG. 1) when the customer 12 arrives at a self-service checkout pay station. The scanning of an "end of transaction" barcode signals the portable barcode gun 22 (and therefore signals the barcode gun server 32) that the customer 12 is ready to checkout at the particular self-service checkout pay station.

Figure 10:
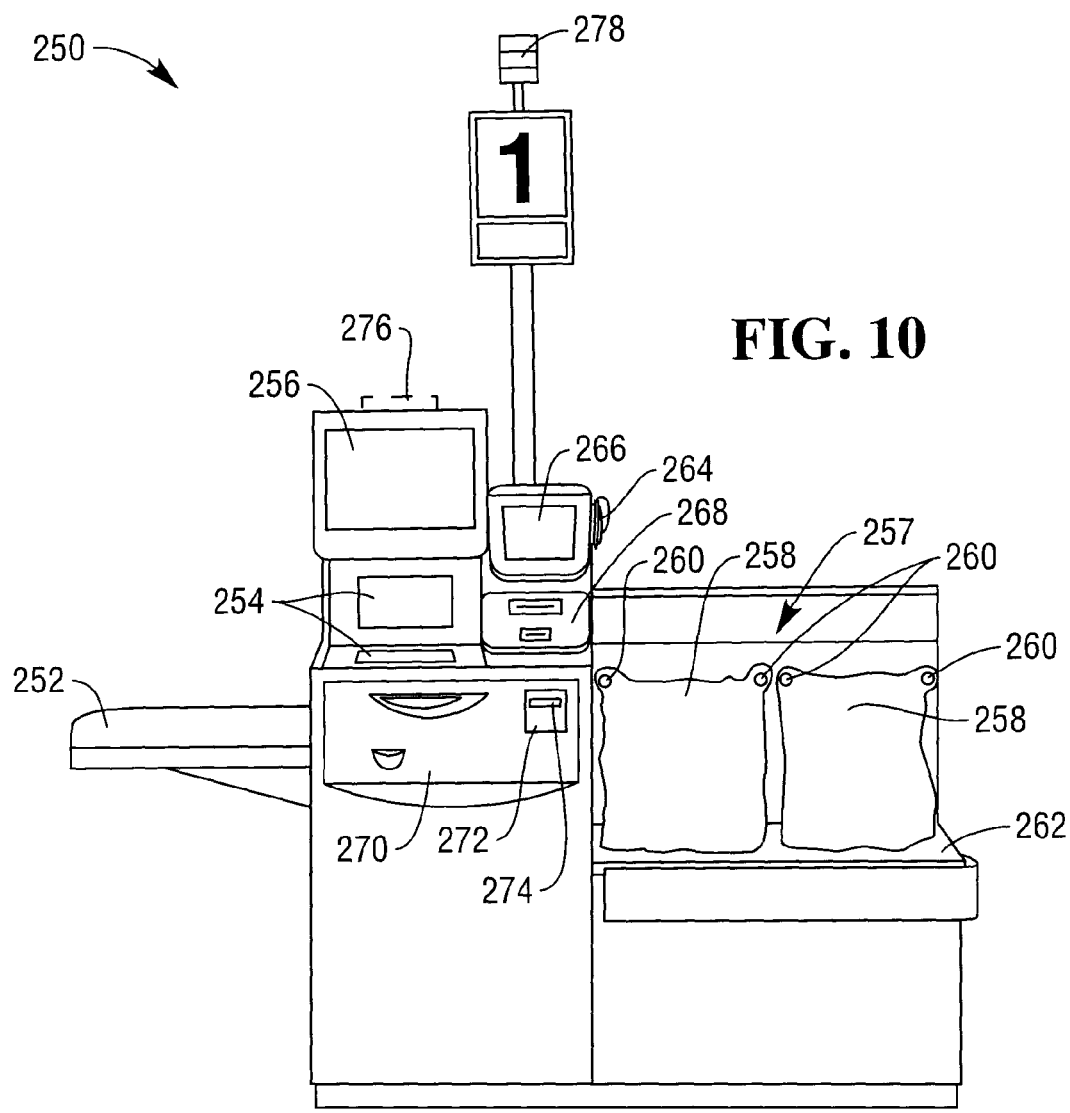
FIG. 10 is a self-service checkout pay station which can be used by the retail customer of FIG. 9 to pay for purchase of a produce item.

One type of self-service checkout pay station at which the customer 12 can checkout is a "mini" checkout pay station, such as shown in FIG. 10 and designated with reference numeral "250". The mini station 250 may include a shelf 252, a scanner/scale module 254, and a customer interface terminal 256. Scanner/scale module 254 uses a laser shining on a glass or other transparent platen to input data from barcodes applied to products or packages. Scanner/scale module 254 may also include a scale for measuring the weight of articles that are sold on a price/unit-of-weight basis, such as some produce items. Customer interface terminal 256 displays item data as it is entered through the scanner/scale module 254.

A bagging area 257 includes bags 258 for storing items that customers have scanned and weighed. The bags 258 are hung from hanging rails 260. A security scale 262 uses item weight data derived from scanner/scale module 254 or a database using a scanned UPC to verify that only the items scanned are placed on the security scale. Security application programs operating within customer interface terminal 256 monitor the security scale 262 to determine whether items not scanned have been added to the security scale.

A card reader 264 enables the customer 12 to make payment for items using a payment card. The card reader 264 may support credit card, debit card, and other payment methods. A signature capture pad 266 is integrated with the card reader 264. The signature capture pad 266 captures a customer's signature while the customer 12 is conducting a self-service checkout transaction at the mini station 250.

An upper currency module 268 receives currency from the customer 12 as payment for a transaction. A lower currency module 270 returns change to the customer 12. A receipt printer module 272 has a receipt dispense slot 274 through which a transaction receipt can be delivered to the customer 12. The receipt itemizes the items purchased and the method of payment.

Electronic control processor 276 required for station operation is housed behind the customer interface terminal 256. The electronic control processor 276 of the mini station 250 controls operation of a wireless communication circuit 278 which communicates wirelessly with the wireless communications circuit 72 (FIG. 3) of the produce weighing scale 52 and a wireless communications circuit (not shown) which is associated with the barcode gun server 32 (FIG. 1). More specifically, after the "end of transaction" barcode is scanned (as was described hereinabove in step 210 of the flowchart 200 of FIG. 9), the wireless communications circuit 278 of the mini station 250 is triggered to communicate with both the wireless communications circuit 72 of the produce weighing scale 52 and the wireless communications circuit associated with the barcode gun server 32 in a manner to be described in the flowchart 300 of FIG. 11 hereinbelow.

Figure 11:
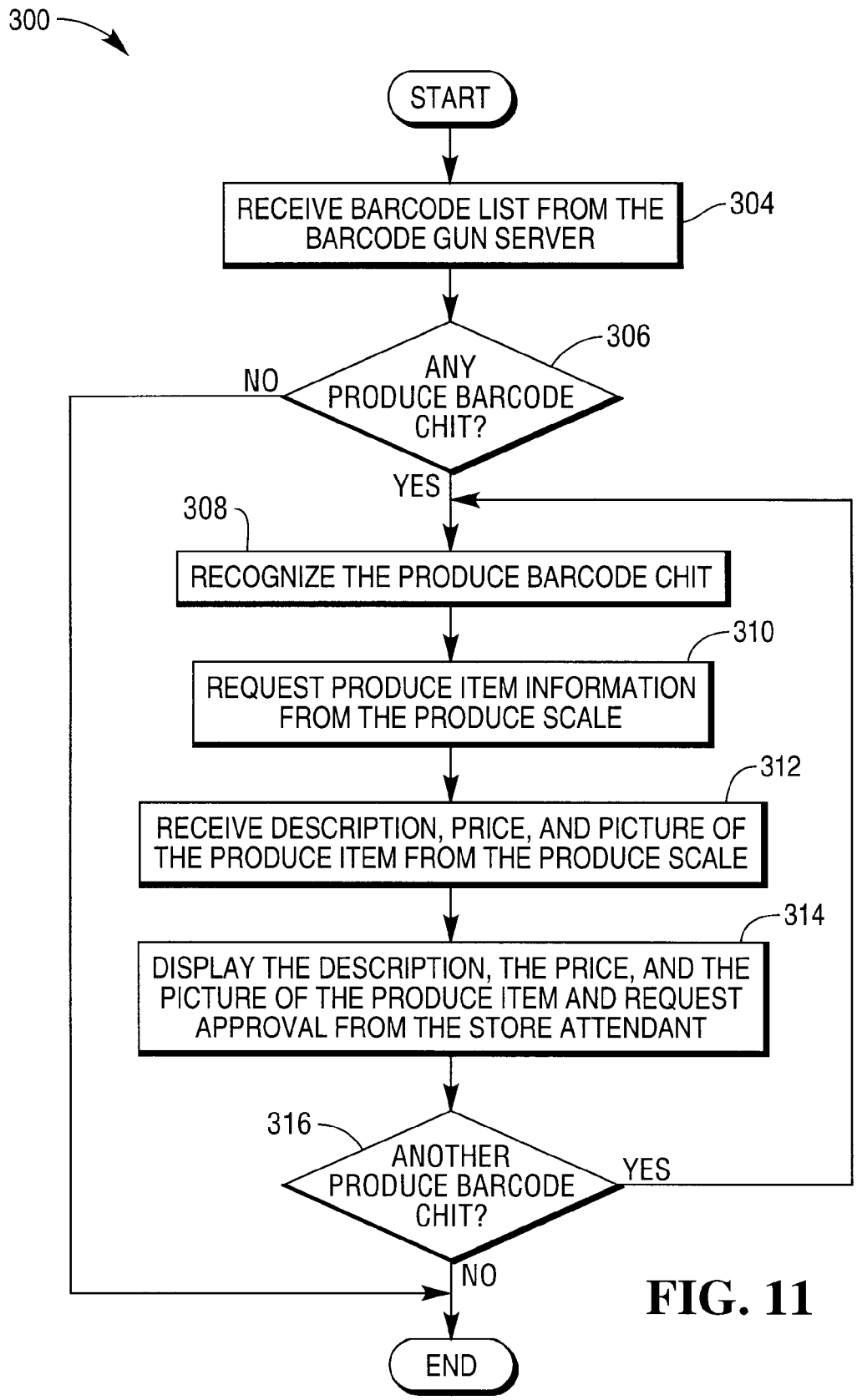
FIG. 11 is a flowchart depicting operation of the self-service checkout pay station of FIG. 10.

Referring to FIG. 11, the flowchart 300 depicts operation of the mini station 250 shown in FIG. 10. After a barcode list is received from the barcode gun server 32 (step 304), a determination is made as to whether the barcode list contains a produce barcode chit (step 306). If the determination in step 306 is negative (i.e., the barcode list contains no produce barcode chit), then the process ends. However, if the determination in step 306 is affirmative (i.e., the barcode list contains a produce barcode chit), the produce barcode chit is recognized (step 308). More specifically, the referral ID (i.e., the fourth identifier part "DDDDD" of the barcode chit 92 shown in FIG. 8) is recognized.

Based upon the referral ID which has been recognized in step 308, produce item information is requested via the wireless communications circuit 72 from the particular produce weighing scale at which a produce item associated with the referral ID has been previously weighed (step 310). In this example case, the produce item was previously weighed at the produce weighing scale 52 which is shown in FIG. 2 and which has been identified by the referral ID recognized in step 308. In step 312, the description of the produce item, the price of the produce item, and the picture of the produce item are received from the produce weighing scale 52 to satisfy the request of step 310. The description of the produce item, the price of the produce item, and the picture of the produce item are then displayed on the customer interface terminal 256 (FIG. 10) of the mini station 250 to allow the store attendant 14 (FIG. 1) to verify that the picture of the produce item matches the corresponding produce item which in possession of the customer 12 (step 314).

A determination is then made in step 316 as to whether the barcode list of step 304 contains another produce barcode chit to be recognized. If the determination in step 316 is affirmative (i.e., the barcode list contains another produce barcode chit to be recognized), then the process returns to step 308 to recognize the corresponding referral ID associated with this next produce barcode chit. However, if the determination in step 316 is negative (i.e., the barcode list does not contain another produce barcode chit to be recognized), then the process ends.

After prices of all items including any produce items are tallied, the customer 12 proceeds to make payment for purchase of the items. Payment is effected at the mini station 250 using either cash or a payment card in known manner. After making payment, the customer 12 can leave the retail grocery store 10.

Figure 12:
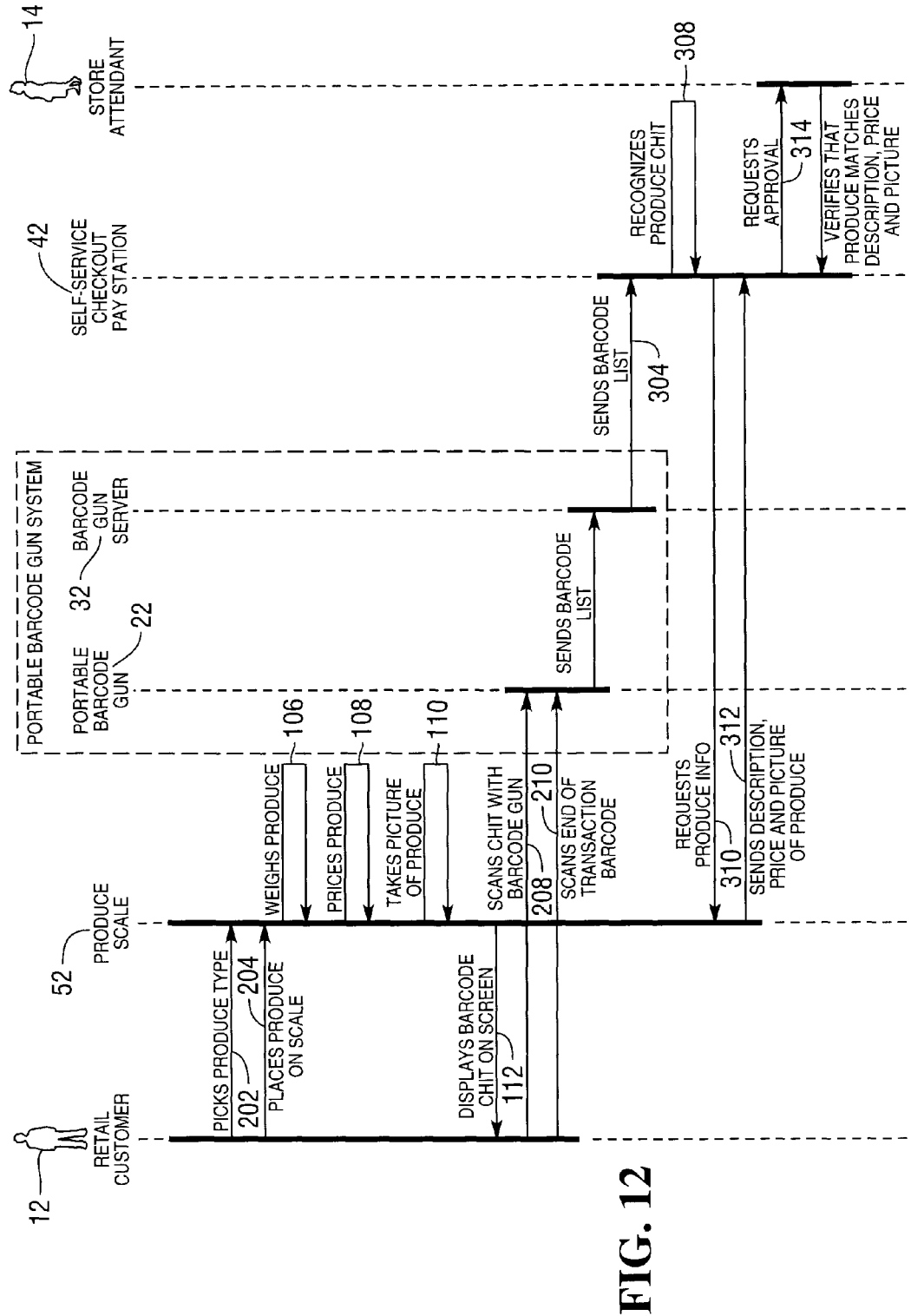
FIG. 12 is a sequence diagram which illustrates in one figure the relationships of the various store components of FIG. 1 and certain interaction and communication steps from the flowcharts of FIGS. 4, 9, and 11.

Referring to FIG. 12, a sequence diagram illustrates in one figure the relationships of the various store components of the retail grocery store shown in FIG. 1, and some of the interaction and communication steps from the flowchart 100 of FIG. 4 which depicts operation of the produce weighing scale 52, the flowchart 200 of FIG. 9 which depicts steps undertaken by the customer 12, and the flowchart 300 of FIG. 11 which depicts operation of the mini station 250 of FIG. 10. Reference numerals shown in FIG. 12 correspond to same reference numerals shown in FIGS. 1, 4, 9, and 11.

It should be apparent that co-operation of the produce weighing scale 52 and the mini station 250 described hereinabove allows the customer 12 to purchase a produce item without any assistance from a store clerk. A store clerk is not responsible for weighing a produce item desired to be purchased by the customer 12. The customer 12 is able to use the portable barcode gun 22 to ring up all items including produce items, and then to make payment at the mini station 250 without having to handle produce items in a different way from non-produce items. Moreover, the customer 12 does not need to weigh produce items at checkout, and does not need to remove produce items from a shopping cart. The result is an uninterrupted flow of a self scanning transaction of all items (i.e., both non-produce items and produce items) using the portable barcode gun 22.

It should further be apparent that co-operation of the produce weighing scale 52 and the mini station 250 described hereinabove requires no barcode chit to be printed on paper. The customer 12 simply uses the portable barcode gun 22 and scans the barcode chit 92 directly from display screen 90 on the touchscreen 58. Since the produce weighing scale 52 needs no paper, there is no paper costs associated with operation thereof.

It should also be apparent that the customer 12 is able to see the price of the produce item before checkout. This feature is beneficial over known store systems in which produce items are weighed on a produce weighing scale which is located at a self-service checkout pay station. In these known store systems, a customer may not see the price of a produce item until the customer checks out at the self-service checkout pay station.

Although the above description describes the produce weighing scale 52 prompting the customer 12 to select the produce type before prompting the customer to place the produce item on the produce weighing scale, it is conceivable that the produce weighing scale prompt the customer to place the produce item on the produce weighing scale before prompting the customer to select the produce type. Moreover, although the above description describes a display screen in which the customer selects the produce type by entering a UPC, it is conceivable that the customer may select the produce type in a different way. For example, the customer may select the produce type by selecting a picture of a produce item from a number of different pictures of produce items on the display screen.

Although the above description describes the communications circuit 72 of the produce weighing scale 52 as being wireless and the communications circuit 278 of the mini station 250 as being wireless, it is conceivable that both of these communications circuits be physically hardwired to each other. As an example, the communications circuit 72 and the communications circuit 278 may be hardwired to each other via a standard Ethernet link. Moreover, it is conceivable that the communications circuit 278 of the mini station 250 may be hardwired to a communications circuit (not shown) which is associated with the barcode gun server 32.

Also, although the above description describes the barcode chit 92 as having four identifier parts, it is conceivable that the barcode chit have a different number of identifier parts. As an example, the first identifier part "AA" may not be needed if it can be inferred from the second identifier part "BBB" that the item in question is a produce item. As another example, additional identifier parts may be added as desired.

Further, although the above description describes the mini station 250 being used, it is conceivable that another type of self-service checkout pay station may be used. As an example, a full-featured type of self-service checkout pay station may be used. As another example, a bare-minimum type of self-service checkout pay station may be used. Such a bare-minimum checkout pay station may comprise only a payment terminal with no scanners, no scales, and no bagging area.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A produce weighing scale in a produce section which is remote from a store exit section of a retail grocery store, the produce weighing scale comprising:
   a base;
   a weighing platform disposed on the base;
   a touchscreen arranged to enable a retail customer in the produce section of the retail grocery store to enter produce data associated with a produce item and to view display screens which contains instructions to operate the produce weighing scale;
   an actuatable picture camera positioned over the weighing platform and for, when actuated, capturing at least a partial electronic picture of a produce item which has been placed on the weighing platform; and
   electronic control circuitry including (i) a communications circuit which can electronically communicate over a store communications network with a communications circuit of a self-service checkout pay station in the store exit section of the retail grocery store, and (ii) an electronic processor which is arranged to provide an actuation signal to actuate the picture camera to capture at least a partial electronic picture of a produce item which has been placed by a retail customer on the weighing platform, and display a barcode chit on the touchscreen to allow a retail customer to self-scan the displayed barcode chit without having to print the barcode chit.

2. A produce weighing scale according to claim 1, wherein the electronic processor is arranged to provide the actuation signal to actuate the picture camera immediately in response to a produce item being placed on the weighing platform.

3. A produce weighing scale according to claim 1, wherein the communications circuit comprises a wireless communications circuit arranged to wirelessly communicate over a store communications network with a wireless communications circuit of a self-service checkout pay station in the store exit section of the retail grocery store.

4. A produce weighing scale according to claim 1, wherein the picture camera comprises a color digital picture camera.

5. A produce weighing scale in a produce section which is remote from a store exit section of a retail grocery store, the produce weighing scale comprising:
   a base;
   a weighing platform disposed on the base;
   a user interface arranged to enable a retail customer in the produce section of the retail grocery store to interact with the produce weighing scale;
   a first support arm which extends substantially vertically from the base;
   a second support arm which extends substantially transverse relative to the first support arm and which extends substantially horizontally relative to the weighing platform;
   an actuatable picture camera disposed at a distal end of the second support arm and positioned over the weighing platform and for, when actuated, capturing at least a partial electronic picture of a produce item which has been placed on the weighing platform; and
   electronic control circuitry including (i) a communications circuit which can electronically communicate over a store communications network with a communications circuit of a self-service checkout pay station in the store exit section of the retail grocery store, and (ii) an electronic processor which is arranged to provide an actuation signal to actuate the picture camera to capture at least a partial electronic picture of a produce item which has been placed by a retail customer on the weighing platform.

6. A produce weighing scale according to claim 5, wherein the first and second support arms co-operate to support the picture camera over the weighing platform.

7. A produce weighing scale according to claim 6, wherein length of the first support arm and length of the second support arm are selected such that the picture camera captures a full captured electronic picture of a produce item when the picture camera is actuated in response to the produce item being placed on the weighing platform.

8. A produce weighing scale according to claim 5, wherein the electronic processor is arranged to provide the actuation signal to actuate the picture camera immediately in response to a produce item being placed on the weighing platform.

9. A produce weighing scale according to claim 5, wherein the communications circuit comprises a wireless communications circuit arranged to wirelessly communicate over a store communications network with a wireless communications circuit of a self-service checkout pay station in the store exit section of the retail grocery store.

10. A produce weighing scale according to claim 5, wherein the user interface comprises a touchscreen for enabling a retail customer to enter produce data associated with a produce item and to view display screens which contain instructions to operate the produce weighing scale.

11. A produce weighing scale according to claim 5, wherein the picture camera comprises a color digital picture camera.

12. A method of operating a produce weighing scale in a produce section which is remote from a store exit section of a retail grocery store and having a weighing platform, an actuatable picture camera positioned over the weighing platform, and a touchscreen for enabling a retail customer to interact with the produce weighing scale, the method comprising:
generating an actuation signal in response to a retail customer placing a produce item on the weighing platform;
applying the actuation signal to the picture camera to actuate the picture camera so that picture camera can capture at least a partial electronic picture of the produce item which has been placed on the weighing platform; and
electronically transmitting the captured electronic picture of the produce item over a store communications network to a self-service checkout pay station in the store exit section of the retail grocery store when a request is received from the self-service checkout pay station in response to the retail customer interacting with the self-service checkout pay station to make payment for purchase of the produce item.

13. A method of operating a produce weighing scale according to claim 12, further comprising displaying a barcode chit to allow the retail customer to self-scan the displayed barcode chit without any assistance from a retail store clerk.

14. A method of operating a produce weighing scale according to claim 12, further comprising displaying a barcode chit to allow the retail customer to self-scan the displayed barcode chit without having to print the barcode chit.

15. A method of operating a produce weighing scale according to claim 12, further comprising displaying a barcode chit to allow the retail customer to self-scan the displayed barcode chit without any assistance from a retail store clerk and without having to print the barcode chit.

16. A method of operating a produce weighing scale according to claim 12, wherein electronically transmitting the captured electronic picture of the produce item over a store communications network to a self-service checkout pay station comprises wirelessly transmitting the captured electronic picture of the produce item over a store communications network to a self-service checkout pay station when a request signal is received from the self-service checkout pay station in response to the retail customer interacting with the self-service checkout pay station to make payment for purchase of the produce item.

17. A method of operating a produce weighing scale according to claim 12, wherein the actuation signal to the picture camera is provided immediately in response to the produce item being placed onto the weighing platform.

18. A method of operating a produce weighing scale according to claim 12, wherein the captured electronic picture comprises a color electronic picture of the produce item.

19. A method of operating a produce weighing scale according to claim 18, wherein the captured electronic picture comprises a full electronic picture of the produce item.

20. A method of operating a produce weighing scale according to claim 16, further comprising wirelessly transmitting description and price of the produce item over the store communications network to the self-service checkout pay station when the request signal is received from the self-service checkout pay station in response to the retail customer interacting with the self-service checkout pay station to make payment for purchase of the produce item.

\* \* \* \* \*